UNITED STATES PATENT OFFICE.

KARL WILDHAGEN, OF TRESEBURG, BRUNSWICK, GERMANY.

ROOFING COMPOSITION OF TAR, CEMENT, &c.

SPECIFICATION forming part of Letters Patent No. 315,584, dated April 14, 1885.

Application filed July 14, 1884. (No specimens.) Patented in Germany August 3, 1883, No. 23,440.

*To all whom it may concern:*

Be it known that I, KARL WILDHAGEN, of Treseburg, in Brunswick, German Empire, have invented a new and useful Improvement in Roofing of Tar, Cement, (for which I have obtained patent in Germany, No. 23,440, dated August 3, 1883,) of which the following is a specification.

To make this composition I take four parts of vegetable fiber, two parts of fine mineral matter or coal-ashes, and one part of mineral coal-tar, and mix them together with water until the mixture constitutes a stiff mortar. The composition thus formed is available for excluding moisture from any part of a building. When used on a tile roof it adheres firmly to the tiles, but does not injure them, and its flexibility (which is never wholly lost) prevents it from being dislodged by any slight movement of the tiles. When laid on laths for roofing, the composition fills the interstices. After it hardens its surface is thinly covered with mineral coal-tar, a second layer of the composition is laid thereon, and then a mixture of pulverized cement and sand is sieved over the surface and pressed into the composition, completing the roofing. The cement extracts some of the moisture from the composition. The said composition can be easily worked up, hardens without fully drying, is not sticky, does not dissolve in water, attaches itself firmly to wood and stones, and is proof against fires. The vegetable fiber employed as one of its ingredients may be ground or chemically-dissolved wood fiber, straw fiber, tanner's bark, roots, or other suitable vegetable material.

I am aware that the patent granted to S. B. and P. Pierce, No. 73,645, January 20, 1868, describes a roofing composition consisting of eight parts of Rosendale cement, one part of gravel, one part of sand, one part of asphaltum, one part of coal-tar, one part of sandstone, one part of rosin, one part of ashes, and one part of lime. This composition I do not claim. I am also aware that several of the above-mentioned ingredients have been used together by other parties, and that the use of plastic roofing materials in successive layers is not new. Such compositions and methods I do not broadly claim; but What I do claim is—

1. A composition of matter consisting of four parts of vegetable fiber, two parts of pulverized mineral matter or coal-ashes, one part of mineral tar, and sufficient water to make the mixture plastic, for the purposes set forth.

2. A roofing consisting of a layer of vegetable fiber, mineral matter, and coal-tar mixed and made plastic, a layer of coal-tar thereon, a second layer of the said mixture on said coal-tar, and a mixture of cement and sand on the latter, the whole forming a mass of roofing material, substantially as set forth.

In testimony whereof I have signed my name to this specification in the presence of two subscribing witnesses.

KARL WILDHAGEN.

Witnesses:
  HUGO TATAKY,
  G. H. SMITH.